H. M. Glines.
Weaving Heddle.

No. 378.

Reissued Jul. 15, 1856.

Witnesses:
Edward Cunning
Alexander Ingraham

Inventor:
Preston Bennet
J. Wm. Kimbrough
Lyman A. Cook

N. PETERS, PHOTO-LITHOGRAPHER, WASHINGTON, D. C.

UNITED STATES PATENT OFFICE.

H. M. GLINES, OF MANCHESTER, NEW HAMPSHIRE, ASSIGNOR, BY MESNE ASSIGNMENTS, TO P. BENNET, J. KENDRICK, AND L. A. COOK.

IMPROVEMENT IN MACHINERY FOR FILLING SEINE-NEEDLES.

Specification forming part of Letters Patent No. 13,629, dated October 2, 1855; Reissue No. 378, dated July 15, 1856.

*To all whom it may concern:*

Be it known that I, HUMPHREY M. GLINES, of Manchester, in the county of Hillsborough and State of New Hampshire, have invented a new and useful machine for winding or filling the needles with twine which are used in making weavers' harness, nets, seines, &c., of which the following is a full, clear, and exact description, reference being had to the accompanying drawings, in which—

Figure 1:
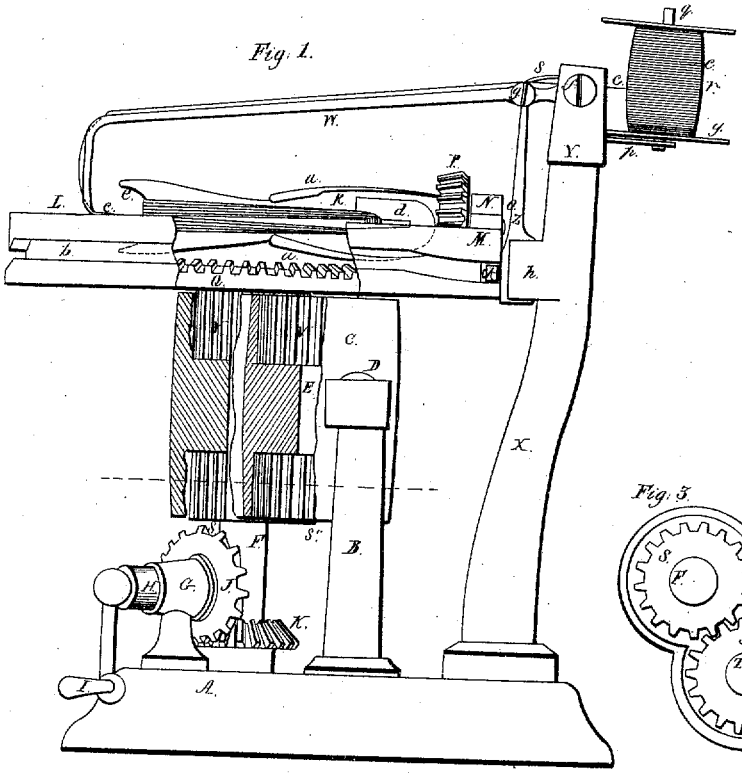
Figure 4:
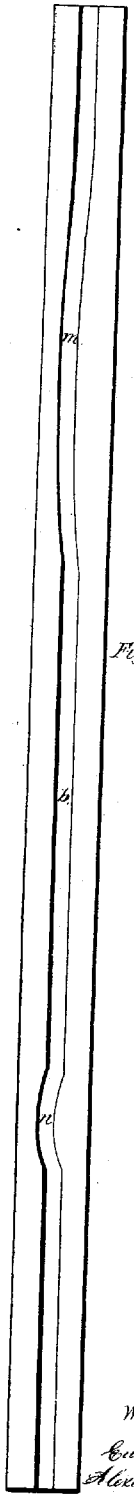
Figure 5:
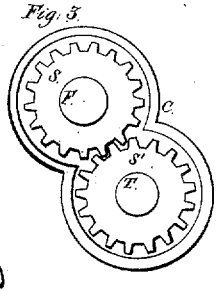
Figure 2:
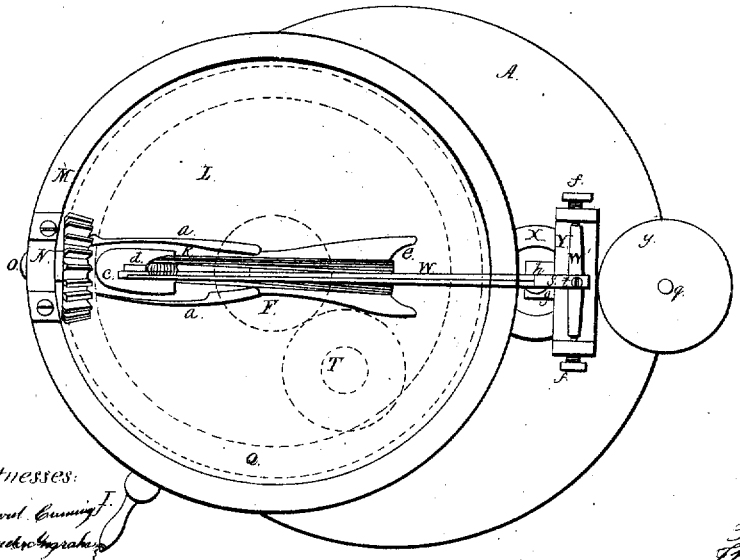

Figure 1 is an elevation of the machine. Fig. 2 is a plan. Fig. 3 is a plan of the gearing; and Fig. 4 is a plan of the cam which operates the arm to deliver the twine to fill the needle.

The same letters indicate like parts in all the figures.

Seine and other like needles are flat, with the rear end scored out and the forward end rounded or pointed, with an open space or eye just back of the point, and a tongue projecting from the body into the said eye. The twine, cord, or thread is wound or mounted on such needles longitudinally, but not continuously around. It is laid in the score at the back edge, then carried forward to and in the eye on one side of the tongue, around the tongue, and out again on the other side of the tongue, but on the same side of the needle. Then it runs back to and around the back edge in the score, then forward into the eye on one side of the tongue, under the tongue, and out again on the other side of the tongue, and so on until the required quantity has been put on.

The object of the said invention is to perform automatically, by an organized machine, the operation of winding the twine, cord, or thread onto seine-needles; and the said invention consists in giving to the seine-needle and to a vibrating arm or equivalent therefor, which carries the twine, cord, or thread, the required mechanical motions for laying the said twine, cord, or thread into the eye of the needle, around the stem thereof, and out again, and then around to the other side to perform the like operation, and so on until the required quantity is put on.

In the above-mentioned drawings, A is a circular base, of cast-iron, into which the posts B B are firmly fastened to support the case C, which is provided with ears fitted to the tops of the posts and secured by screws, as represented at D in the drawings. The side of the case C is represented as broken away at Fig. 1 to show the arrangement of the gearing, and it is bored out at each end in the form of a figure 8, (eight,) (see Fig. 3,) so as to receive two gear-wheels, which work together, as represented in Fig. 3, and the middle portion, E, has two holes through it for the journals of the shafts which carry the gears, or upon which they turn. The lower journal of the shaft F turns in the base A, and its upper journal turns in the middle, E, of the case C. The stand G is fastened to the base A, and is perforated for the journal of the shaft H, which is provided with a crank, I, so as to operate the machine by hand; but it may be furnished with a gear or pulley, so as to operate it by other power. The gear J is fastened to the shaft H, and turns the gear K, fastened to shaft F, which shaft has the cam-wheel L fastened to its upper end, so as to turn with the shaft. The wheel L has a rim, M, on its upper surface, to which the box N is fastened for the journal of the shaft O, which is fitted to turn in said box, which shaft has the gear P, of twenty teeth, fastened to it, which is acted upon by the gear Q, of eighty teeth, which turns in a recess in the lower side of the wheel L. The shaft O has two curved arms, *a a*, projecting from it in toward the center of the wheel L. These arms are made elastic, and provided with scores for a short distance near their ends, to fit the edges of the needle R, which is inserted between them by springing the arms apart and placing the needle R between them and letting them spring together so as to hold it, the end of the needle being inserted into a score prepared for it in the end of the shaft O at the same time. The gear S is fastened to the shaft F, and turns the gear S′. Each of these gears has seventeen teeth, as represented in Fig. 3, and the gear S′ is fastened to a short shaft, T, that turns in the middle, E, of the case C. This shaft T has the gear U, of eighteen teeth, fastened to its upper end to drive the gear V, of sixteen teeth, which turns on the shaft F, and is fastened to the gear Q, so as to turn it faster than the cam-wheel L turns, which is fastened to the shaft F. The result or effect of this arrangement of gearing is to turn the shaft O, which carries the needle, just as fast as the cam-wheel L is turned, so that the arm W, which is vibrated by the cam-groove *b* in the wheel L, will deliver the twine *c c* alternately under the tongue *d*, and across the score *e* of the needle R as the machine is operated by turning the crank I, heretofore described. The stand X is fastened to the base A, and it is provided with a T-cross, Y, at the top, which has two ears perforated by the screws *f f*, with conical points, which fit into the ends of the axle W′ of the arm W, so as to allow it (the arm) to vibrate when it is operated by the traversing rod Z, fastened to it by the screw *g*, which rod is fitted to traverse in a score in the projection *h* on the stand X, the rod Z being provided with a pivot for the roller *k* to turn upon, which works in the cam-groove *b* in the wheel L, as represented in Fig. 1. The periphery of the wheel L is represented as unrolled in Fig. 4, to show the cam-groove *l*, which is provided with a long curve, *m*, to depress the arm W and carry the twine *c c* into the score *e* in the needle R, and a short curve, *n*, to depress the arm W suddenly and carry the twine under the tongue *d* of the needle R as the machine is operated. The arm *p* is fastened to the stand X, and has the spindle *q* fastened in it, on which the spool *r* turns as the twine *c c* is drawn from it through a hole in the axle W′, and under the spring *s*, which may be adjusted by the screw *t*, so as to apply sufficient friction to the twine *c c* as it passes under it and through the holes in the angles of the arm W, as represented by dotted lines, and wind it with a proper degree of tension on the needle R, as represented. When the needle R is filled with twine, it may be removed by springing open the arms *a a*, and another needle put in between the arms, as heretofore described.

The foregoing description and drawings present what is believed to be the best mode of application of the principle or mode of operation of the said invention; but it will be obvious that many changes may be made in the mere mode of application by the substitution of mechanical equivalents having the same mode of operation, and therefore it is not desired to limit the claim of invention to such mere mode of application, so long as the same result is obtained by analogous means.

What is claimed as new, and desired to be secured by Letters Patent, is—

Imparting to the needle and to the arm or equivalent therefor the motions, substantially such as herein described, for carrying the twine, cord, or thread into the eye of the needle, around the tongue, and then out of the eye, substantially as described, and by the means specified, or equivalents therefor.

H. M. GLINES.

Witnesses:
HIRAM TURNER,
G. M. FLANDERS.